United States Patent [19]

Lee et al.

[11] 4,392,980

[45] Jul. 12, 1983

[54] TRANSITION METAL ALUMINATES

[75] Inventors: John M. Lee; William C. Bauman, both of Lake Jackson, Tex.

[73] Assignee: The Dow Chemical Co., Midland, Mich.

[21] Appl. No.: 362,690

[22] Filed: Mar. 29, 1982

Related U.S. Application Data

[60] Division of Ser. No. 183,908, Sep. 4, 1980, Pat. No. 4,333,846, which is a continuation-in-part of Ser. No. 939,545, Sep. 5, 1978, Pat. No. 4,221,767, which is a division of Ser. No. 812,534, Jul. 5, 1977, Pat. No. 4,116,856, and a continuation-in-part of Ser. No. 95,692, Nov. 19, 1979, which is a division of Ser. No. 939,545, Sep. 5, 1978, Pat. No. 4,221,767, which is a division of Ser. No. 812,534, Jul. 5, 1977, Pat. No. 4,166,856, and a continuation-in-part of Ser. No. 95,691, Nov. 19, 1979, abandoned, which is a continuation-in-part of Ser. No. 939,545, Sep. 5, 1978, Pat. No. 4,221,767, which is a division of Ser. No. 812,534, Jul. 5, 1977, Pat. No. 4,166,856.

[51] Int. Cl.$^3$ .............................................. B01D 15/04
[52] U.S. Cl. ..................................... 252/184; 210/667; 252/463; 252/466 J; 423/24; 423/49; 423/100; 423/139; 423/600
[58] Field of Search ................... 252/174, 463, 466 J; 423/24, 49, 100, 139, 600

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |

*Primary Examiner*—Irwin Gluck
*Attorney, Agent, or Firm*—W. J. Lee

[57] ABSTRACT

Crystalline transition metal aluminates conforming generally to the formula $$MA_a{}^v Z_b{}^v \cdot nAl(OH)_3 \cdot mH_2O$$

where M is a transition metal having a valence charge of +2 selected from the group consisting of Cu, Zn, Mn, Fe, Co, and Ni, where AZ represents negative valence ions or radicals, v is a negative valence of 1, 2, or 3, n is a value to provide a mol ratio of Al/M of at least 1/1, preferably at least 1.5/1, and m is an integer of from zero to the maximum for waters of hydration, with (va)+(vb) equal to 2, are prepared in alkaline aqueous medium wherein transition metal compounds are caused to form adducts with amorphous hydrous alumina, Al(OH)$_3$, said adducts forming crystals when heated, said aluminates being useful, e.g., as ion exchangers and as spinel precursors among other things.

14 Claims, No Drawings

TRANSITION METAL ALUMINATES

CROSS-REFERENCE TO RELATED APPLICATION

This is a divisional of application Ser. No. 183,908, filed Sept. 4, 1980, now U.S. Pat. No. 4,333,846, which is a Continuation-in-part of Ser. No. 939,545, Sept. 5, 1978, now U.S. Pat. No. 4,221,767, which is a division of Ser. No. 812,534, July 5, 1977, now U.S. Pat. No. 4,116,856, and a continuation-in-part of Ser. No. 95,692, Nov. 19, 1979, which is a division of Ser. No. 939,545, Sept. 5, 1978, now U.S. Pat. No. 4,221,767, which is a division of Ser. No. 812,534, July 5, 1977, now U.S. Pat. No. 4,116,856, and a continuation-in-part of Ser. No. 95,691, Nov. 19, 1979, abandoned, which is a continuation-in-part of Ser. No. 939,545, Sept. 5, 1978, now U.S. Pat. No. 4,221,767, which is a division of Ser. No. 812,534, July 5, 1977, now U.S. Pat. No. 4,116,856.

BACKGROUND OF THE INVENTION

It is disclosed in our U.S. Pat. Nos. 4,116,856; 4,116,858; and 4,159,311 that novel crystalline compounds are formed, especially in certain reticular ion exchange resins, by contacting aqueous solutions of Li halides with hydrous alumina, $Al(OH)_3$, to form $LiX.2Al(OH)_3$ crystals, where X is halide, which are useful in selectively removing Li ions from aqueous solutions. Preparation of $LiOH.2Al(OH)_3$ is also disclosed.

In our U.S. Pat. Nos. 4,116,857 and 4,183,900 it is disclosed that $MgX_2.2Al(OH)_3$, where X is halide, is prepared by reacting Mg halide with hydrous alumina in an ion exchange resin and that the so-formed aluminate is useful in selectively removing Mg ions from aqueous solution.

Maksimovic, in Compt. Rend. Soc. Serbe Geol. Ann 1955, reported on x-ray diffraction studies of Takovite, a natural mineral from Takova, Serbia which he identified as nickel aluminum oxide hydroxide hydrate, $Ni_5Al_4O_2(OH)_{18}.6H_2O$. He reported x-ray data as follows:

| dA° | I/I$_1$ | hkl | Other data given |
|---|---|---|---|
| 7.57 | 100 | 001 | Rad. $FeK_a$ |
| 3.77 | 90 | 002 | $\lambda 1.9380$ |
| 2.603 | 40 | | dia. 19 cm |
| 2.552 | 90 | 003 | $c_o$ 7.6 |
| 2.375 | 50 b | | $\Sigma_a$ 1.598 |
| 2.264 | 80 | | $\Sigma_y$ 1.605 |
| 2.031 | 20 | | Blue-green color |
| 1.917 | 90 | 004 | |
| 1.708 | 70 b | | |
| 1.613 | 60 b | | |
| 1.510 | 80 | 005 | |
| 1.481 | 80 | | |
| 1.401 | 30 vb | | |
| 1.373 | 60 | | |
| 1.256 | 50 | | |
| 1.241 | 10 b | | |
| 1.183 | 40 b | | |

Gallezot, in Compt. Rend. 268B, 323–31 (1969), reported on x-ray diffraction studies of hexagonal nickel aluminum oxide hydrate, identified as $Ni_5Al_4O_{11}.18H_2O$ and as $2Al_2O_3.5NiO.18H_2O$. He reported x-ray data as follows:

| dA° | I/I$_1$ | hkl | Other data given |
|---|---|---|---|
| 7.55 | 100 | 001 | I/I$_1$ visual |
| 3.76 | 40 | 002 | Sys. hexagonal |
| 2.61 | 10 | 100 | $a_O$ 3.019 |
| 2.55 | 30 | 101 | $C_O$ 7.525 |
| 2.27 | 30 b | 102 | |
| 1.96 | 30 b | 103 | |
| 1.881 | <5 | 004 | |
| 1.510 | 20 | 110 | |
| 1.481 | 20 | 111 | |
| 1.401 | 10 | 112 | |
| 1.294 | 10 | 113 | |
| 1.255 | 5 | 006 | |
| 1.177 | 5 | 114 | |

SUMMARY OF THE INVENTION

It has been found, unexpectedly, that novel and useful transition metal aluminates are formed by reacting compounds of certain transition metals with hydrous alumina, e.g. $Al(OH)_3$, to form certain transition metal aluminates which are crystallizable by heating. The aluminates so-formed are useful, e.g., as ion exchangers and as precursors to spinels among other things; they may be supported by a substrate or may be unsupported.

Crystalline transition metal aluminates conforming generally to the formula

$$MA_a{}^v Z_b{}^v . nAl(OH)_3 . mH_2O$$

where M is a transition metal having a valence charge of +2 selected from the group comprising Cu, Zn, Mn, Fe, Co, and Ni, A and Z each represent negative valence ions or radicals selected from the group comprising hydroxyl, halide, inorganic acid, and organic acid, v is a negative valence of 1, 2, or 3, n is a value to provide a mol ratio of Al/M of at least 1/1, preferably at least 1.5/1, m is a value of from zero to the maximum for waters of hydration, a and b are each values of from zero to 2, with (va)+(vb) equal to 2, are prepared in alkaline aqueous medium wherein transition metal compounds are caused to form adducts with amorphous hydrous alumina, $Al(OH)_3$, said adducts forming crystals when heated.

DETAILED DESCRIPTION OF THE INVENTION

The transition metals within the purview of this invention comprise one or more of the group comprising Cu, Zn, Mn, Fe, Co, and Ni, all in their divalent form. The starting transition metal compounds are referred to herein as "MAZ" compounds, where M is the transition metal and AZ represents the negative radical(s) or anion(s). Each "A" and "Z" may be the same as, or different from, the other.

The hydrous aluminas within the purview of this invention are amorphous and conform essentially to the formula $Al(OH)_3$ along with whatever waters of hydration are present. The waters of hydration will depend, to some extent, on the methods of preparation and the pH, temperature, and environment in which the hydrous alumina is formed or dispersed. Preferably the amorphous hydrous alumina is freshly formed in aqueous medium by precipitation of a dissolved Al compound, such as $AlCl_3$, by the action of a non-interfering transient base, such as $NH_3$. Other bases, e.g. alkali metal hydroxide, create alkali metal aluminates which are not directly useful in forming the aluminates of the present invention. Likewise alkaline earth metal bases can form alkaline earth metal aluminates which are not directly useful in forming the aluminates of the present invention. Crystalline Al(OH)$_3$, e.g., Gibbsite, Bayerite, or Norstrandite, is usually converted to Boehmite (crystalline AlOOH) when heated.

The amorphous Al(OH)$_3$ may be a neat (unsupported) dispersion of the Al(OH)$_3$ in aqueous medium or may be supported on and/or within a substrate. Non-porous or reticular inorganic or organic substrates may be used to support the Al(OH)$_3$, so long as the substrates do not substantially interfere with the desired formation of the subject crystalline aluminates. The precipitated Al(OH)$_3$ is usually a suspension of small gel particles, each particle being a small piece of gel.

There are, of course, substrates which permit the formation of the crystalline transition metal aluminates, but which offer certain reactivities of their own during subsequent use of the said supported crystalline aluminates, such as ion exchange resin substrates. It should be borne in mind that if one wishes to heat the supported aluminate to very high temperature, one must consider the effect of such high temperature on the substrate. For instance, if one wishes to convert the supported aluminate to a spinel form at a very high temperature (say, 1000° C. or more) without destroying the substrate, then the choice of substrates is considerably narrowed. The subject aluminates are generally prepared in situ on the substrate when a substrate is used, but may also be prepared as an aqueous dispersion and then deposited on or within a substrate.

As mentioned, supra, it is preferred that the amorphous Al(OH)$_3$ be freshly prepared, such as by precipitating Al(OH)$_3$ by the action of NH$_3$ or NH$_4$OH on a solution of an Al salt, such as AlCl$_3$. Contacting of the MAZ compound with the Al(OH)$_3$ may be done simultaneously with, or subsequent to, the Al(OH)$_3$ formation. Since elevated temperature and/or long periods of standing can cause the Al(OH)$_3$ to become at least partially crystallized to forms such as Boehmite or Norstrandite, it is best to avoid using elevated temperatures until the MAZ has been added to the Al(OH)$_3$. After the MAZ compound has been mixed with the Al(OH)$_3$ to form an adduct, the adduct is then heated to crystallize it to the subject MA$_a{}^y$Z$_b{}^y$.nAl(OH)$_3$.mH$_2$O which is described elsewhere herein. The following descriptions generally illustrate the preparations.

PREPARATION OF UNSUPPORTED ALUMINATES

An alkaline aqueous dispersion of hydrous alumina (which is preferably freshly prepared) is mixed well with at least one MAZ compound to form an adduct or complex which, when heated to a temperature in the range of about 50° C. to about 150° C. for a period of time of from about 1 hour to about 100 hours, yields the subject crystalline MA$_a{}^y$Z$_b{}^y$.nAl(OH)$_3$.mH$_2$O compounds. The average particle size of the neatly prepared (i.e. unsupported) crystals is generally in the range of about 0.01 microns to about 1 microns, probably depending somewhat on the alkalinity and/or other surfactants or micelles in the aqueous solution.

PREPARATION OF ALUMINATES ON INERT, NON-POROUS SUBSTRATES

Hydrous alumina is precipitated in aqueous medium onto the surfaces of substantially inert, non-porous substrates or is mixed with said substrates in aqueous medium and reacted with at least one MAZ compound in the aqueous medium to form the subject crystalline compounds. By "non-porous" it is meant here that there are no pores visible to the naked eye, though the surface as viewed under high magnification is likely to appear rough or irregular. Surfaces which appear mirror-smooth, even under magnification, are not likely to hold well to an appreciable amount of the coating. The affinity of the surfaces of the substrate for receiving the reactant compounds (hydrous alumina and MAZ compounds) may be enhanced or improved by roughening the surfaces. The substrates may be organic (e.g. polymers) or inorganic (e.g. stable oxides), or metallic (e.g. metal particles, screens, or sheets). Natural or resinous type substrates (e.g. cellulosic, wood, etc.) may be used as the substrate. Mixing of said hydrous alumina and MAZ compounds in a substrate-containing aqueous medium in a ball-mill, tumbler or other mixing device is contemplated, said mixing being done prior, during, or subsequent to the step of heating to obtain the subject crystals.

PREPARATION OF ALUMINATES ON INERT, RETICULAR SUBSTRATES

The use of substantially inert, reticular substrates are contemplated. Such substrates are employed in substantially the same manner as with the non-porous substrates discussed supra. The term "reticular" is used herein to refer to the presence of holes, voids, channels, cracks, indentations or other physical features which permit the reactant compounds to enter the physical structure of the substrate rather than merely coat the outer surfaces. For optimum penetration into the substrate, it is best if substrate imbibes an aqueous solution of a soluble Al compound (e.g. AlCl$_3$) before the pH is increased (e.g. with NH$_3$ or NH$_4$OH) to precipitate hydrous alumina (Al(OH)$_3$). The soluble MAZ compound may then also penetrate the substrate to substantially react with the Al(OH)$_3$ and, upon heating, the subject crystals are formed in, and on, the substrate.

PREPARATION OF ALUMINATES IN RETICULAR ION EXCHANGE RESINS

The use of reticular ion exchange resins as substrates is carried out in substantially the same manner as with other reticular substrates as discussed, supra, including the optimum loading of the crystals on, and into, the exchange resin by the in situ precipitation of hydrous alumina from a soluble Al compound that has permeated the resin. The ion exchange resin may, itself, be substantially of the anionic or cationic, or mixed cation-anion variety. Once the subject crystals are formed on, or within, the ion exchange resin one may use the composite to alternately, or simultaneously, utilize the ion exchange capabilities of the subject aluminate crystals and of the resin.

THE MAZ COMPOUNDS

The anions or negative radicals which may be employed as a compound with the transition metal to form the subject aluminates, MAZ.nAl(OH)$_3$, may have a valence of 1, 2, or 3. The transition metal compound is preferably water-soluble and/or alkali soluble, but may also be a compound which, when added to alkaline water, will react to form water-soluble compounds. Transition metal compounds containing more than one of the subject transition metals may be used. The "AZ"

may represent two monovalent ions or radicals; or one divalent ion or radical; or two-thirds of a trivalent ion or radical.

Examples of monovalent, divalent, and trivalent anions and negative radicals contemplated within the purview of the present invention to be used in the generic formula $MA_a{}^v Z_b{}^v \cdot nAl(OH)_3 \cdot mH_2O$ as defined herein, are as follows:

halide- (esp. $Cl^-$, $Br^-$, $I^-$)
hydroxy- ($OH^-$)
dihydrophosphate- ($H_2PO_4{}^-$)
sulfate-- ($SO_4{}^{--}$)
hydrocarbonic- ($HCO_3{}^-$)
hydrophosphate-- ($HPO_4{}^{--}$)
nitrate- ($NO_3{}^-$)
chromate- ($HCrO_4{}^-$)
trichloroacetic- ($Cl_3C-COO^-$)

other inorganic acid radicals and organic acid radicals of monobasic, dibasic, and tribasic carboxylic acids having 1 to about 8 carbon atoms, with the valence of 1, 2, or 3 corresponding to the number of carboxyl groups present in the organic acid moiety.

The above is not an exhaustive listing, but is believed to be representative of the various negative radicals and anions contemplated to illustrate those which contain halogens, inorganic salt radicals, oxy radicals, and carboxylic radicals. Other radicals and anions will become obvious to practitioners of the relevant arts once they learn of the present invention.

In the generic formula $MA_a{}^v Z_b{}^v \cdot nAl(OH)_3 \cdot mH_2O$ the value of n should be enough to provide a mol ratio of Al/M of at least 1/1, preferably at least about 1.5/1, most preferably at least about 2/1. At Al/M ratios of less than 1/1 in the process of preparing the crystalline subject aluminates, other forms of crystals may be formed which are not within the purview of the present invention. During the formation process to obtain the desired crystals, it is best if the Al/M ratio is at least about 1/1, preferably about 1.5/1 to about 2/1. Once the crystal is formed the MAZ portion of the aluminate may be substantially depleted by use of an aqueous elution step without destroying the aluminate crystal, so long as there remains enough of the MAZ moiety present within the three-layered structure to retain integrity of the crystal. Generally, one may substantially retain the three-layered hexagonal expanded crystal structure so long as there remains enough MAZ moiety so that the Al/M ratio does not exceed about 4/1. When the crystal structure has a reduced amount of MAZ moiety, there is available space within the three-layers of the unit cell of the hexagonal crystal lattice to take up additional MAZ moieites until the crystal becomes essentially "packed" or "loaded" at an Al/M ratio in the range of about 1.5/1 to 2/1. The three layers of the unit cell comprise three layers of the $Al(OH)_3$ complexed with intercalated layers of the MAZ moiety. The unit cell layered structure may be graphically illustrated for discussion purposes as:

| |
|---|
| Al—O |
| MAZ |
| Al—O |
| MAZ |
| Al—O |
| MAZ |

Also in the above generic formula the value of m for the waters of hydration may be from zero (when the crystal has been dehydrated by heating) to as much as 6 or more depending on the particular MAZ moiety in the crystal and on the temperature, pH, and conditions of the preparation. Though there may be more than 6 waters of hydration in the crystal, it is believed that most of the crystals within the purview of this invention will be less than 6 and most often less than about 4.

As discussed, supra, the transition metal aluminate crystals of the present invention are three-layered, hexagonal with intermediate (or intercalated) layers of the MAZ moiety between layers of the hydrated alumina. The crystals are further identifiable by a-axis cell constants typically in the range of about 5.2–5.5 (direct) and c-axis cell constants typically in the range of about 20–50 (direct). It will be understood, of course, that the a-axis and c-axis cell measurements will vary to some degree according to the particular MAZ compound and amount of MAZ compound in the crystal when formed.

In a given crystal, the MAZ may be eluted with an aqueous wash, taking care not to remove all the MAZ; then the crystal which is "unloaded" with respect to MAZ may be used in selectively taking up more of the same MAZ from aqueous solution. This phenomenon makes it possible to tailor-make a crystal to remove from solution any one compound of a transition metal selected from the group consisting of Cu, Zn, Mn, Fe, Co, and Ni. This phenomenon is demonstrated by example hereinafter. The phenomenon is particularly applicable when the crystal is deposited within the matrices of a reticular (esp. a microporous) ion exchange resin in bead or particulate form.

Furthermore, the negative radical (or anion) in a given crystal structure may be exchanged with a different negative radical (or anion) in aqueous solution, thus giving rise to additional or alternate novel forms of the transition metal aluminate structure. For example a crystalline $NiCl_2 \cdot 2Al(OH)_3$ may undergo anion exchange with different anions in aqueous solution, such as $NO_3{}^-$, to form $Ni(NO_3)_2 \cdot 2Al(OH)_3$ and/or $NiCl(NO_3) \cdot 2Al(OH)_3$ depending on the concentration of each in the aqueous medium.

EXAMPLE 1

(Nickel Aluminates)

For this example, the substrate employed is a macroporous anion exchange resin which is known commercially as DOWEX ® MWA-1-Cl$^-$. It is a porous bead form of a cross-linked styrene-divinylbenzene polymer network having amine groups attached to the benzene rings and is in its chloride form (though the OH$^-$ form is usable). The resin has a porosity of about 30% and a surface area of about 40–50 m$^2$/g.

The resin beads are saturated with an excess of 32% $AlCl_3$ aqueous solution. The $AlCl_3$-impregnated beads are subjected to a flow of inert gas (viz. $N_2$) to remove excess $AlCl_3$ solution until the resin is substantially dry and free-flowing. A 75 gm. portion of the beads is treated with 200 ml. of 30% aqueous $NH_3$ for about 15 minutes at ambient room temperature; this converts the $AlCl_3$ to amorphous $Al(OH)_3$ and forms soluble $NH_4Cl$ in the aqueous phase. The product is washed well with water to remove solubles and 98 ml. of the resin, containing $Al(OH)_3$, is obtained. The resin is added to 250 ml aqueous solution containing 25.5 gms. $NiCl_2 \cdot 6H_2O$ and 34 gms. of $NH_4Cl$. The resultant slurry is refluxed at atmospheric (ambient) pressure for 16 hours (overnight) and 130 ml. of resin composite is obtained; the gain in volume of the beads indicates that they are swelled. The product is identified by x-ray diffraction analysis as a hexagonal, three-layered, crystalline $NiCl_2.5 \cdot nAl(OH)_3 \cdot mH_2O$ with the $NiCl_2$ being the intermediate layer, expanding the crystalline $Al(OH)_3$ structure. The x-ray diffraction data is as follows:

|  | Reciprocal | Direct | Sig(dir) |
|---|---|---|---|
| A | 0.22074 | 5.23113 | 0.00193 |
| B | 0.22074 | 5.23113 | 0.00193 |
| C | 0.04429 | 22.58042 | 0.01236 |
| Alpha | 90.00000 | 90.00000 | 0.00000 |
| Beta | 90.00000 | 90.00000 | 0.00000 |
| Gamma | 60.00000 | 120.00000 | 0.00000 |
| Volume | 0.00187 | 535.12217 | |

| Line # | hkl | d obs | d calc | diff × $10^{-4}$ | 2-theta obs | 2-theta calc | diff × $10^{-3}$ |
|---|---|---|---|---|---|---|---|
| 1 | 003 | 7.5700 | 7.5268 | 432.0 | 11.680 | 11.747 | −67.3 |
| 2 | 006 | 3.7700 | 3.7634 | 66.0 | 23.578 | 23.620 | −42.0 |
| 3 | 111 | 2.6030 | 2.5982 | 48.1 | 34.424 | 34.490 | −65.7 |
| 4 | 112 | 2.5520 | 2.5481 | 39.2 | 35.134 | 35.190 | −55.8 |
| 5 | 114 | 2.3750 | 2.3732 | 18.0 | 37.848 | 37.878 | −29.8 |
| 6 | 200 | 2.2640 | 2.2651 | −11.4 | 39.780 | 39.759 | 20.9 |
| 7 | 115 | 2.2640 | 2.2634 | 6.4 | 39.780 | 39.792 | −11.7 |
| 8 | 117 | 2.0310 | 2.0316 | −6.3 | 44.574 | 44.559 | 14.6 |
| 9 | 118 | 1.9170 | 1.9185 | −14.9 | 47.381 | 47.342 | 39.0 |
| 10 | 1110 | 1.7080 | 1.7092 | −12.1 | 53.611 | 53.570 | 41.1 |
| 11 | 121 | 1.7080 | 1.7074 | 6.1 | 53.611 | 53.632 | −20.8 |
| 12 | 030 | 1.5100 | 1.5101 | −1.0 | 62.341 | 61.337 | 4.3 |
| 13 | 303 | 1.4810 | 1.4806 | 4.1 | 62.676 | 62.696 | −19.3 |
| 14 | 036 | 1.4010 | 1.4015 | −4.8 | 66.705 | 66.679 | 25.8 |
| 15 | 1114 | 1.3730 | 1.3729 | 1.5 | 68.250 | 68.258 | −8.4 |
| 16 | 310 | 1.2560 | 1.2565 | −4.8 | 75.651 | 75.617 | 33.7 |

About 120 ml. of the resin is loaded into a jacketed glass column and washed with de-ionized water (downflow) at 23 ml./min. and 50° C., sampling the effluent in 50 ml. cuts for $Ni^{++}$ analysis, as follows:

| Cut No. | Vol. (ml) | $Ni^{++}$ Conc. (gm/l) |
|---|---|---|
| 1 | 50 | 0.965 |
| 2 | 50 | 1.503 |
| 3 | 50 | 2.850 |
| 4 | 50 | 3.420 |
| 5 | 50 | 1.905 |
| 6 | 50 | 1.050 |
| 7 | 50 | 1.033 |
| 8 | 50 | 0.830 |
| 9 | 50 | 0.652 |
| 10 | 50 | 0.499 |
| 11 | 50 | 0.355 |

The above wash substantially "unloads" the $NiCl_2$ from the resin, but not to the extent of allowing the $Al(OH)_3$ lattice to collapse and destroy the "vacancies" in the three-layer crystal.

The column is then operated downflow with 26% NaCl brine containing 0.5 gm/l $Ni^{++}$ (as $NiCl_2$) at 23 ml/min. and 50° C. Cuts of 10− ml. each are taken of the effluent for $Ni^{++}$ analysis. Cuts 1–14 inc. show zero $Ni^{++}$ content which indicates the $Ni^{++}$ in the brine is being retained in the crystal. $Ni^{++}$ breakthrough is detected in cut 15 (100 ml.) as follows:

| Cut No. | Vol. (ml.) | $Ni^{++}$ (gm/l) |
|---|---|---|
| 15 | 100 | 0.070 |
| 16 | 100 | 0.100 |
| 17 | 100 | 0.430 |
| 18 | 100 | 0.390 |
| 19 | 100 | 0.390 |

The column is then operated again on water elution downflow at a rate of 23 ml./min. at 50° C. The effluent is cut into 25 ml. segments and each is analyzed for $Ni^{++}$ content, as follows:

| Cut No. | Vol. (ml.) | $Ni^{++}$ (gm/l) |
|---|---|---|
| 1 | 25 | 0.390 |
| 2 | 25 | 0.390 |
| 3 | 25 | 0.388 |
| 4 | 25 | 0.415 |
| 5 | 25 | 2.37 |
| 6 | 25 | 4.725 |
| 7 | 25 | 2.700 |
| 8 | 25 | 2.300 |
| 9 | 25 | 1.675 |
| 10 | 25 | 1.280 |
| 11 | 25 | 1.100 |

The demonstrated ability of the crystal Ni aluminate to give up much of its $Ni^{++}$ values and then selectively re-absorb $Ni^{++}$ values is found in other aqueous solutions, such as brines containing other salts, e.g., $CaCl_2$, $MgCl_2$, KCl, $SrCl_2$ and others. Recovery of, e.g., $NiSO_4$ values from mine wastes or ore smelters or other mineral sources operates substantially in the same manner.

Whereas it is possible to prepare a large variety of concentrations of Al/Ni in the crystal and of Al/(amine nitrogen) of the crystal in the resin, the usual range appears to be about 1 to about 2 for Al/Ni and about 0.5 to 3.0 for Al/(amine nitrogen).

In place of $NiCl_2$ values in the crystal described supra, one may also utilize $NiSO_4$, $Ni(NO_3)_2$, Ni-acetate, Ni-(citrate)$_{2/3}$ and a wide variety of anion or negative radicals having a valence of 1, 2, or 3 and to use such $Ni^{++}$ deficient crystals to absorb such other Ni compounds.

EXAMPLE 2

(Cobalt Aluminates)

A cobalt aluminate crystalline material is prepared and tested as an absorber for $Co^{++}$ values substantially in accordance with the procedure shown in Example 1 for Ni aluminates.

The ion-exchange resin is treated with excess 31% $AlCl_3$ solution, the excess blown out with $N_2$ to substantial dryness. An 85 gm. portion is added to 200 ml. of 30% aqueous $NH_3$ and allowed to react for about 15 minutes, thus obtaining $Al(OH)_3$ in the resin; the so-formed composite is washed well with water, obtaining about 112 ml. of still-wet composite. This is added to an aqueous solution containing 30 gm. $CoCl_2.6H_2O$ and 30 gm. $NH_4Cl$ in 250 ml. $H_2O$ and refluxed at ambient pressure for 16 hours (overnight). The final pH is about 5.57 and the resin is found to be swelled to about 145 ml. volume. X-ray diffraction analysis shows the typical hexagonal, three-layered crystal, the x-ray data being shown below:

|  | Reciprocal | Direct | Sig(dir) |
|---|---|---|---|
| A | 0.21709 | 5.31893 | 0.00962 |

-continued

| | | | |
|---|---|---|---|
| B | 0.21709 | 5.31893 | 0.00962 |
| C | 0.04307 | 23.21919 | 0.03210 |
| Alpha | 90.00000 | 90.00000 | 0.00000 |
| Beta | 90.00000 | 90.00000 | 0.00000 |
| Gamma | 60.00000 | 120.00000 | 0.00000 |
| Volume | 0.00176 | 568.88680 | |

| Line # | hkl | d obs | d calc | diff × $10^{-4}$ | 2-theta obs | 2-theta calc | diff × $10^{-3}$ |
|---|---|---|---|---|---|---|---|
| 1 | 006 | 3.8674 | 3.8699 | −25.0 | 22.976 | 22.961 | 15.0 |
| 2 | 112 | 2.5890 | 2.5923 | −32.8 | 34.615 | 34.570 | 45.1 |
| 3 | 009 | 2.5890 | 2.5799 | 91.4 | 34.615 | 34.742 | −126.5 |
| 4 | 118 | 1.9615 | 1.9608 | 6.8 | 46.244 | 46.261 | −17.1 |
| 5 | 207 | 1.8924 | 1.8918 | 5.2 | 48.037 | 48.051 | −14.1 |
| 6 | 1111 | 1.6501 | 1.6533 | −32.5 | 55.652 | 55.534 | 118.7 |
| 7 | 030 | 1.5343 | 1.5354 | −11.1 | 60.266 | 60.218 | 48.3 |
| 8 | 039 | 1.3216 | 1.3194 | 21.8 | 71.297 | 71.432 | −135.6 |
| 9 | 222 | 1.3216 | 1.3211 | 5.3 | 71.297 | 71.329 | −32.7 |

A 116 ml. portion of the so-formed resin composite is placed in a jacketed glass column and washed well with water to substantially reduce the $CoCl_2$ content of the crystal. A 26% NaCl brine containing 0.48 gm. $Co^{++}$/liter is downflowed through the resin bed at 22 ml./min. and 50° C. The effluent is taken in 100-ml. cuts (20 cuts in all), with analysis of spot samples as follows:

| Cut No. | Vol. (ml) | $Co^{++}$ (gm/l) |
|---|---|---|
| 7 | 100 | 0.05 |
| 12 | 100 | 0.15 |
| 16 | 100 | 0.28 |
| 17 | 100 | 0.29 |
| 18 | 100 | 0.29 |

The column is eluted with $H_2O$ downflow at 22 ml./min. and 50° C. with effluent taken in 25-ml. cuts which are analyzed for $Co^{++}$ as follows:

| Cut No. | Vol. (ml.) | $Co^{++}$ (gm./l) |
|---|---|---|
| 1 | 25 | 0.233 |
| 2 | 25 | 0.250 |
| 3 | 25 | 0.250 |
| 4 | 25 | 0.280 |
| 5 | 25 | 3.48 |
| 6 | 25 | 5.4 |
| 7 | 25 | 4.8 |
| 8 | 25 | 4.44 |
| 9 | 25 | 3.36 |
| 10 | 25 | 2.80 |
| 11 | 25 | 2.36 |
| 12 | 25 | 2.08 |
| 13 | 25 | 1.84 |

The chloride ion may be exchanged for other anions or negative radicals, e.g., $Br^-$, $SO_4^{--}$, $NO_3^-$, acetate, chloroacetate, oxalate, citrate, etc., without altering the hexagonal configuration.

The crystalline $CoAZ.nAl(OH)_3.mH_2O$ is useful as a spinel precursor, as a $Co^{++}$ ion getter for use with aqueous medium containing $Co^{++}$-ores, $Co^{++}$-minerals, $Co^{++}$-waste streams, $Co^{++}$-containing brines etc. by washing $Co^{++}$ values from the crystals, leaving vacancies in the crystals for taking up more $Co^{++}$ values.

EXAMPLE 3

(Zinc Aluminates)

A resin-zinc aluminate preparation is carried out by loading 90 ml. of DOWEX® MWA-1-OH with 1 mmole of $Al(OH)_3$/ml. by equilibration with 30% $AlCl_3$ solution, dried to free flowing, reacting with excess 30% aqueous $NH_3$, heating with $NH_4Cl$ added and titrating with 135 meq. of HCl to pH5. The volume of resin composite at end point is 139 ml. The resin is rinsed with 300 ml. of $H_2O$ containing 60 gms. of zinc acetate dihydrate and heated in a 95° C. oven for 4 days. Analysis by x-ray shows desirable Zn aluminate in acetate form along with some Bayerite and/or Norstrandite (this indicates that too much heating before the addition of zinc acetate, can prematurely transform some of the amorphous alumina hydrate to crystalline forms). The resin is washed, suspended in NaCl brine and titrated with 100 meq. of NaOH as pH is kept below pH 7.0. The Zinc hydrate precipitated outside the resin is washed out, 50 gm. of Zn acetate dihydrate is added, then the composite is heated in a 95° C. oven. X-ray diffraction analysis indicates good crystals of the Zinc acetate aluminate hydrate.

A 120 ml. portion of the composite is placed in a glass column fitted for a jacket temperature control. The column is held at 65° C. A synthetic brine of 1 gram Zn/liter is prepared by dissolving $ZnCl_2$ in 25% NaCl. This brine is pumped at 10 ml/min. through the column. The resin shows 3.5% shrinkage but the column is filled again. This shrinkage occurs twice; each time the column is again filled. After 800 ml of the 0.0306 N Zn brine, the flow is changed to water at the same rate. Samples are collected for each and Zn content established by titration.

| Brine Flow | Zn (gm/l) | Water Elution | Zn (gm/l) |
|---|---|---|---|
| 1-100 cc discarded | — | 1-50 cc | 0.0320 N |
| 2-100 cc | 0.005 N | 2-25 cc | 0.036 |
| 3-100 cc | 0.0065 | 3-25 cc | 0.032 |
| 4-100 cc | 0.0160 | 4-25 cc | 0.130 |
| 5-100 cc | 0.0170 | 5-25 cc | 0.228 |
| 6-100 cc | 0.0195 | 6-25 cc | 0.240 |
| 6-100 cc | 0.0275 | 7-25 cc | 0.224 |
| 8-100 cc | 0.0315 | 8-25 cc | 0.228 |
| | | 9-25 cc | 0.214 |
| | | 10-25 cc | 0.198 |

The crystalline zinc aluminate in its chloride form has been identified by x-ray diffraction and its hexagonal structure has been closely defined. The chemical constitution is variable $(ZnCl)_x[Al(OH)_3]_m$— water wash will remove a portion of the $ZnCl_2$— and the $Cl^-$ may be exchanged for other anions without altering the crystal character.

EXAMPLE 4

(Cu Aluminates)

Resin-crystal preparation: 130 ml of Dowex® MWA-1-$Cl^-$ is rinsed, sucked dry, and added to excess 30% $AlCl_3$. The excess $AlCl_3$ is sucked off at 87° C. and the resin is dried to 98.73 gms in a stream of $N_2$. The resin is treated with excess 30% aqueous $NH_3$ and then washed with water. The basic resin is added to a solution of 83 g $Na_2SO_4$ in 300 ml $H_2O$, heated to 50°-55° C., and 35 g $CuSO_4.5H_2O$ is slowly added with the pH held at 4.0–4.5. Finally it is heated at 100° C. with the pH dropping to 3.8.

110 ml of this resin is placed in a jacketed glass column and saturated with $Cu^{++}$ by flowing a solution of 25% NaCl containing 1.0 g/l of $Cu^{++}$ (added as $CuSO_4.5H_2O$) at 10 ml/min and 70° C. The $Cu^{++}$ is eluted with water at 10 ml/min and 70° C. The effluent is sampled and analyzed for Cu++, as shown in the following table:

| Sample No. | Volume (ml) | Cu++ in g/l |
|---|---|---|
| 6 | 50 | 0.65 |
| 7 | 25 | 0.95 |
| 8 | 23 | 7.4 |
| 9 | 25 | 11.2 |
| 10 | 25 | 5.6 |
| 11 | 25 | 3.0 |
| 12 | 25 | 2.2 |
| 13 | 25 | 1.6 |

The crystalline copper aluminate in its sulfate form has been identified by x-ray diffraction and its hexagonal structure has been closely defined. The chemical constitution is variable $(CuSO_4)_x[Al(OH)_3]_m$— water wash will remove a portion of the $CuSO_4$— and the $SO_4$ may be exchanged for other anions without altering the crystal character.

This microcrystalline copper aluminate is formed within the pores of a macroporous anion exchange resin. The anion exchange resin is a cross-linked styrene-divinyl benzene polymer network to which is affixed $—CH_2N(CH_3)_2$ groups (Dowex ® MWA-1) or

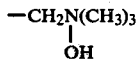

groups (Dowex ® MSA-1). The Dow macroporous resins normally contain about 30-40% porosity and have a surface area of 40-50 m²/g.

Such resin composites usually contain 0.8–3.0 mols Al/mol N and about 0.5–1.0 mols Cu/mol Al.

EXAMPLE 5

(Mn Aluminates)

90 ml of Dowex ® MWA-1, which has been treated once with saturated $AlCl_3$, dried and then added to 30% aqueous $NH_3$ to precipitate the $Al(OH)_3$ within the pores of Dowex ® MWA-1, is wet with water under vacuum to displace all air, and then is titrated in the presence of $NH_4Cl$ with 130 meq of HCl to pH5 at 80° C. Yield is 134 ml of Dowex ® MWA-1-Cl+Al(OH)$_3$. In about 300 ml total volume 50 g $MnCl_2.4H_2O$ is added at 30° C., the pH5.6. All is heated to 80° C., and one normal NaOH is dripped in at constant pH6.0. After 39.5 meq of NaOH a brown precipitate is observed. 10 meq HCl to pH5.4 at 78° C. is added. All of the dark precipitate does not dissolve and is put in a 95° C. oven overnight. By x-ray there is found a small amount of $MnCl_2.nAl(OH)_3$ and Bayerite or Norstrandite. After three days it is washed, excess $NH_4OH$ added, then washed again; add NaCl plus excess of theory $MnCl_2$, heat to 75° C., pH5.7. After 95° C. oven heating overnight it gives good crystals of the aluminate in Dowex ® MWA-1.

In a glass jacketed column is placed 110 ml of the resin and, at 65° C., pump first brine, then water at 10 ml/min.

The synthetic brine is prepared by dissolving 3.6024 g $MnCl_2/4H_2O$, 295 g NaCl in 885 g $H_2O$ to yield one liter containing 1.0 g Mn/liter. Samples are collected and analyzed for Mn.

| | Cut | Vol cc | g Mn/liter |
|---|---|---|---|
| Brine → | 1 | 100 | — |
| | 2 | 100 | 0.8 |
| | 3 | 50 | 0.6 |
| | 4 | 50 | 0.65 |
| | 5 | 50 | 0.75 |
| | 6 | 50 | 0.75 |
| | 7 | 50 | — |
| | 8 | 50 | — |
| | 9 | 50 | 0.75 |
| To Water → | 10 | 50 | 0.90 |
| | 11 | 25 | 1.50 |
| | 12 | 25 | 7.70 |
| | 13 | 25 | 16.00 |
| | 14 | 25 | 15.00 |
| | 15 | 25 | 13.20 |
| | 16 | 25 | 12.50 |

The crystalline manganese aluminate in its chloride form has been identified by x-ray diffraction and its hexagonal structure has been closely defined. The chemical constitution is variable $(MnCl_2)_x[Al(OH)_3]_n$— water wash will remove a portion of the $MnCl_2$— and the $Cl^-$ may be exchanged for other anions without altering the crystal character.

This microcrystalline manganese aluminate is formed within the pores of a macroporous anion exchange resin. The anion exchange resin is a cross-linked styrene-divinyl benzene polymer network to which is affixed $—CH_2N(CH_3)_3$ groups (Dowex ® MWA-1) or

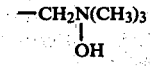

groups (Dowex ® MSA-1). The Dow macroporous resins normally contain about 30-40% porosity and have a surface area of 40-50 m²/g.

Such resin composites usually contain 0.8–3.0 mols Al/mol N and about 0.5–1.0 mols Mn/mol Al.

EXAMPLE 6

(Fe Aluminates)

A sample of Dowex ® MWA-1 (known as AN-2) is equilibrated with 30% $AlCl_3$ solution, dried to free flowing, then added to excess aqueous 30% $NH_3$. After washing, 115 ml of the product is further treated.

A large amount of $NH_4Cl$ is added and the whole slurry is titrated with 50 meq HCl at 35° C. to pH7. About 300 cc of D.I. $H_2O$ and 69.5 g $FeSO_4.7H_2O$ are added and all placed in a 95° C. oven. After 24 hours, and cooled to 25° C. the pH is about 4.5. Some crystalline $FeSO_4.nAl(OH)_3$ is found by x-ray. The resin composite is washed with $H_2O$, slurried in excess $NH_4OH$ and washed again. The wet resin with 300 ml $H_2O$ and 69.5 g $FeSO_4.7H_2O$, is again placed in a 95° oven. After an additional 24 hours, the resin is again washed with $NH_4OH$ as before, then returned with 20.0 g $FeSO_4.7H_2O$ to the 95° C. oven for another 24 hours. The product is now well crystallized.

110 ml of the product is placed in a jacketed temperature controlled column and synthetic brine and water were pumped through at 10 ml/min and 65° C. Samples are collected and titrated for Fe(+2). Feed brine is prepared by adding Fe(2) to 1 g/liter in 25% NaCl[0.035NFe(+2)].

| | Cut | Vol cc | Normality in Fe |
|---|---|---|---|
| Brine → | | | |
| | 1 | 100 | Discarded |
| | 2 | 100 | 0.0015 N |
| | 3 | 100 | 0.0030 |
| | 4 | 100 | 0.0030 |
| | 5 | 100 | 0.0120 |
| | 6 | 100 | 0.020 |
| | 7 | 100 | 0.023 |
| | 8 | 100 | 0.026 |
| | 9 | 100 | 0.0275 |
| | 10 | 85 | 0.0282 |
| $H_2O$ → | | | |
| | 1 | 50 | 0.029 N |
| | 2 | 50 | 0.134 |
| | 3 | 25 | 0.236 |
| | 4 | 25 | 0.188 |
| | 5 | 25 | 0.150 |
| | 6 | 25 | 0.128 |
| | 7 | 25 | 0.112 |
| | 8 | 25 | 0.102 |
| | 9 | 25 | 0.092 |
| | 10 | 25 | 0.084 |

EXAMPLE 7

(Recovery of metal ions from solution)

Removal of transition metal ions (i.e., Cu, Zn, Mn, Fe, Co, or Ni) from aqueous solution is accomplished by using a crystalline transition metal aluminate of the formula $MAZ.nAl(OH)_3.mH_2O$ as described supra, where the transition metal (M) in the aluminate is the same as the transition metal in the aqueous solution. This is done by water-eluting some, but not all, of the MAZ values from the crystal, making the crystal deficient in MAZ values, thus enabling the crystal to make up additional MAZ values in the crystal; such "water-elution" may also be called an "unloading" step.

Thus, a brine solution containing transition metal ions is contacted with a crystal having a deficiency of the same ion, the crystal takes up transition metal ions from the brine until the crystal becomes substantially "reloaded" with the transition metal. Then a substantial amount of the transition metal is water-eluted, giving a relatively much purer solution of the transition metal than the original brine solution; the unloaded crystal is now ready to make up more transition metal values from the brine. Exhaustive unloading of the crystal should be avoided so as to assure that the integrity of the three-layer hydrous alumina hexagonal crystal is not destroyed.

Other modifications and embodiments will become apparent to practitioners of the relevant arts, having learned of this invention and the invention is limited only by the following claims.

We claim:

1. Crystalline transition metal aluminates conforming generally to the formula $$MA_a{}^v Z_b{}^v . nAl(OH)_3 . mH_2O$$

where M is at least one divalent transition metal selected from the group comprising Cu, Zn, Mn, Co, and Ni, where AZ represents negative valence ions or radicals, n is a value of from about 1 to about 4, v is a negative valence of 1, 2, or 3, a and b are each values of from zero to 2, with (va)+(vb) equal to 2, and with m being a value of zero or more.

2. The aluminate of claim 1, wherein the crystallinity is identifiable by x-ray diffraction as being hexagonal having an a-axis cell constant in the range of about 5.2–5.5 (direct) and a c-axis cell constant in the range of about 20–50 (direct).

3. The aluminate of claim 1 wherein the radical(s) or anion(s) (AZ) are selected from the groups consisting of hydroxyl, halide, organic and inorganic acid moieties having valences of from one to three, inclusive.

4. The aluminate of claim 1 wherein the transition metal is only one metal selected from the group consisting of Cu, Zn, Mn, Fe, Co, and Ni.

5. The aluminate of claim 1 wherein the radical(s) or anion(s) are selected from the group consisting of $OH^-$, halide$^-$, sulfate$^{--}$, carbonic$^{--}$, hydrocarbonic$^-$, formate$^-$, hydrophosphate$^{--}$, acetate$^-$, nitrate$^-$, citrate$^{---}$, chromate$^-$, ascorbic$^-$, oxalate$^{--}$, and trichloroacetic$^-$.

6. The aluminate of claim 1 when in crystalline form identifiable by x-ray diffraction as being hexagonal having a-axis of about 5.2–5.5 (direct) and c-axis of about 20–50 (direct), where M is at least one metal selected from the group consisting of Cu, Zn, Mn, Fe, Co, and Ni, where AZ is at least one anion selected from the groups consisting of halo, sulfate, nitrate, hydrophosphate, carbonate, hydrocarbonate, formate, acetate, citrate, hydroxy, chlorate, perchlorate, sulfite, borate, and nitrate.

where n is an integer to provide an Al/M ratio in the range of about 1/1 to about 4/1, and m is an integer in the range of zero to maximum for waters of hydration.

7. The aluminate of claim 1 when unsupported by a substrate.

8. A method for preparing the aluminates of claim 1, said method comprising, mixing amorphous hydrous alumina in an alkaline aqueous medium with the requisite transition metal compound, thus forming an adduct of the transition metal compound with the amorphous hydrous alumina, $Al(OH)_3$, heating the so-formed adduct to crystallization at a temperature in the range of about 50° C. to about 150° C. for a period of time from about 1 hour to about 100 hours, and recovering the so-formed transition metal aluminate.

9. The method of claim 8 wherein there is supplied in the aqueous medium a substrate upon which the adduct is formed.

10. The method of claim 9 wherein the substrate is an ion exchange resin.

11. The method of claim 10 wherein the ion exchange resin is reticular.

12. The method of claim 10 or 11 wherein the ion exchange resin is a cation exchange resin.

13. The method of claim 10 or 11 wherein the ion exchange resin is an anion exchange resin.

14. The method of claim 9 wherein the substrate is at least one selected from the group consisting of natural inorganic, natural organic, metallic, synthetic polymers, synthetic resins, and synthetic inorganics.

* * * * *

UNITED STATES PATENT AND TRADEMARK OFFICE
CERTIFICATE OF CORRECTION

PATENT NO. : 4,392,980
DATED : July 12, 1983
INVENTOR(S) : John M. Lee and William C. Bauman It is certified that error appears in the above—identified patent and that said Letters Patent is hereby corrected as shown below:

Col. 5, line 53, "Moieites" should read --moieties--.

Col. 8, line 59, "refuxed" should read --refluxed--.

Col. 12, line 65, "were" should read --are--.

Col. 13, line 35, "make" should read --take--.

Col. 13, line 47, "make" should read --take--.

Col. 14, line 22, "chloracetic" should read --chloroacetic--.

Col. 14, line 28, "Ni." should read --Ni,--.

Col. 14, line 33, "nitrate." should read --nitrate,--.

Signed and Sealed this

Third Day of January 1984

[SEAL]

Attest:

Attesting Officer

GERALD J. MOSSINGHOFF

Commissioner of Patents and Trademarks